United States Patent [19]

Van Broekhoven et al.

[11] Patent Number: 4,889,914

[45] Date of Patent: Dec. 26, 1989

[54] PREPARATION OF CARBON MONOXIDE/OLEFIN COPOLYMER WITH REMOVAL OF S/FE FROM CARBON MONOXIDE MONOMER

[75] Inventors: Johannes A. M. Van Broekhoven; Maarten M. Geuze; James A. Salter, all of Amsterdam, Netherlands

[73] Assignee: Shell Oil Company, Houston, Tex.

[21] Appl. No.: 213,731

[22] Filed: Jun. 30, 1988

[30] Foreign Application Priority Data

Aug. 25, 1987 [NL] Netherlands .................. 8701981

[51] Int. Cl.$^4$ ................................. C08G 67/02
[52] U.S. Cl. ............................................. 528/392
[58] Field of Search ............................... 528/392

[56] References Cited

U.S. PATENT DOCUMENTS

| 2,495,286 | 1/1950 | Brubaker | 528/392 |
| 3,530,109 | 12/1966 | Fenton | 260/94.9 |

FOREIGN PATENT DOCUMENTS

| 0121965 | 10/1984 | European Pat. Off. . |
| 0181014 | 5/1986 | European Pat. Off. . |
| 213671 | 3/1987 | European Pat. Off. . |
| 227135 | 7/1987 | European Pat. Off. . |
| 0239145 | 9/1987 | European Pat. Off. . |

*Primary Examiner*—Harold D. Anderson
*Attorney, Agent, or Firm*—Dean F. Vance

[57] ABSTRACT

A process for preparing a polyketone wherein sulfidic sulfur and iron carbonyls present in carbon monoxide are removed therefrom before the carbon monoxide is used as feed for the preparation of novel polyketone polymers as well as shaped articles prepared therefrom.

34 Claims, No Drawings

PREPARATION OF CARBON MONOXIDE/OLEFIN COPOLYMER WITH REMOVAL OF S/FE FROM CARBON MONOXIDE MONOMER

BACKGROUND OF THE INVENTION

The invention relates to a process for the preparation of polymers of carbon monoxide with one or more olefinically unsaturated compounds.

High molecular weight linear polymers of carbon monoxide with one or more olefinically unsaturated compounds (for the sake of brevity hereinafter referred to as A), in which the monomer units are present in alternating order and which therefore consist of units of the general formula —(CO)—A'—, wherein A' represents a monomer unit derived from a monomer A used, can be prepared by using palladium-containing catalyst compositions.

Depending on the origin of the carbon monoxide used, the above-mentioned polymerization may lead, at otherwise similar reaction conditions, to results which differ widely as to average reaction rates. This may be due to the use of impure carbon monoxide.

The Applicant has made a systematic research into the effect of impurities which may occur in carbon monoxide on the average reaction rate of the afore-mentioned polymerization. It has been found in the first place that some impurities, such as oxygen, hydrogen, carbon dioxide and water, have absolutely no adverse effect on average reaction rates, even when they are present in the carbon monoxide in very high concentrations. For instance, in relation to hydrogen and carbon dioxide, it was established that the polymerization reactions carried out using a carbon monoxide containing 10% vol hydrogen or 15% vol carbon dioxide as impurities could result in the same high average reaction rates as a corresponding experiment carried out using pure carbon monoxide. However, the research has further shown that there are impurities that have an extremely adverse effect on average reaction rates, even when they are present in the carbon monoxide in parts per million by weight (ppmw) quantities. This is the case with sulfur as sulfidic sulfur, such as in carbon oxysulfide, hydrogen sulfide and lower mercaptans and iron as iron carbonyls. In view of the following, this is a highly surprising find. Very attractive catalyst compositions for the preparation of the present polymers are palladium-containing compositions which contain trifluoroacetic acid as one of the components. An earlier investigation carried out by the Applicant into these catalyst compositions has shown that without affecting the average reaction rate during the polymer preparation, the trifluoroacetic acid may be substituted with a sulfur-containing acid, such as paratoluenesulfonic acid or by sulfur-containing salts, such as sulfates of tin, cerium, vanadium, zirconium, chromium or antimony. For instance, the investigation into the catalyst compositions mentioned hereinbefore has shown that the trifluoroacetic acid present therein may be substituted with iron sulfate without any adverse effect on average reaction rates during polymerization.

Accordingly, it has been discovered that the average reaction rate in the afore-mentioned polymerization can be substantially increased when the sulfur and/or iron contents of the carbon monoxide are decreased before the latter is contacted with the palladium-containing catalyst composition.

SUMMARY OF THE INVENTION

The present patent application relates to a process for the preparation of polymers, in which process, carbon monoxide comprising sulfur such as sulfidic sulfur and/or iron such as iron carbonyls is subjected to one or more purifying treatments by which the sulfur and/or iron contents are decreased and in which the carbon monoxide thus purified is polymerized together with one or more olefinically unsaturated compounds by contacting the mixture with a palladium-containing catalyst composition.

The patent application further relates to the polymers thus prepared and to shaped objects consisting at least partly of these polymers.

DETAILED DESCRIPTION OF THE INVENTION

The degree to which sulfur and iron should be removed from the carbon monoxide is determined on the one hand by the decrease in average reaction rate deemed admissible and on the other hand by the amount of palladium present in the catalyst composition used, calculated on the amount of polymer to be prepared. If a decrease of the average reaction rate to less than 50% is to meet this requirement, sulfur and/or iron must be removed from the carbon monoxide to such a level as to satisfy the relation $X + 1/9\, Y < 3/10\, Z$, wherein X represents the quantity of sulfur and Y the quantity of iron, expressed as ppmw on carbon monoxide and wherein Z represents the quantity of palladium present in the catalyst composition used, expressed as ppmw on the quantity of polymer to be prepared.

In the process according to the invention it is preferred to start from carbon monoxide which does not satisfy the relation $X + 1/9\, Y < 3/10\, Z$, wherein that carbon monoxide is then subjected to one or more purifying treatments, until the carbon monoxide satisfies this relation. It is preferred to use a process in which a carbon monoxide which does not satisfy the relation $X + 1/9\, Y < 2/10\, Z$ is subjected to one or more purifying treatments, whereupon the carbon monoxide does satisfy this relation, and more preferentially, to a process in which a carbon monoxide which does not satisfy the relation $X + 1/9\, Y < 1/10\, Z$ is subjected to one or more purifying treatments, whereupon the carbon monoxide does satisfy this relation. For the removal of sulfidic sulfur and iron carbonyls from carbon monoxide, methods that are known in the art are contemplated as usable herein. Very good results have been obtained by passing the carbon monoxide through a bed consisting of a copper catalyst comprising copper supported on a carrier, in order to remove sulfidic sulfur and by passing the carbon monoxide through a bed consisting of activated carbon, in order to remove iron carbonyls.

Eligible olefinically unsaturated organic compounds which can be polymerized with carbon monoxide according to the invention are both compounds consisting exclusively of carbon and hydrogen and compounds which, in addition to carbon and hydrogen, contain one or more hetero atoms. The process of the invention is preferably employed for the preparation of polymers of carbon monoxide with one or more olefinically unsaturated hydrocarbons. Examples of suitable hydrocarbon monomers are ethene and other α-olefins, such as propene, butene-1, hexene-1 and octene-1, as well as styrene and alkyl-substituted styrenes, such as p-methyl styrene and p-ethyl styrene. The process according to the invention is especially suited to be used for the preparation of copolymers of carbon monoxide and ethene and for the preparation of terpolymers of carbon monoxide with ethene and another olefinically unsaturated hydrocarbon, in particular, propene.

In the olefinically unsaturated hydrocarbons that are eligible for use as comonomers for the polymerization with carbon monoxide according to the invention, there may occur such impurities as alkynes, conjugated dienes and allenes. These compounds may have an adverse effect on average reaction rates during polymerization. Therefore, when olefinically unsaturated hydrocarbons, such as ethene, propene and butene-1, are used as comonomers in the polymerization, preference is given to compounds containing less than 5 ppmw of each one of the contaminants mentioned hereinbefore.

In the process of the invention use is made of a palladium-containing catalyst composition. Particularly suitable catalyst compositions for the present invention are based upon
 (a) a palladium compound,
 (b) an anion of an acid with a pKa of less than 6, and
 (c) a compound of the general formula $R_1R_2M_1$—R—$M_2R_3R_4$, wherein $M_1$ and $M_2$ are similar or different elements chosen from the group made up of arsenic, antimony, phosphorus and nitrogen, and wherein $R_1$, $R_2$, $R_3$ and $R_4$ represent similar or different hydrocarbon groups which optionally may be substituted with polar groups and wherein R represents a bivalent bridging group containing at least two carbon atoms in the bridge.

The palladium compound usable in the catalyst compositions of the invention, as component (a) is preferably a palladium salt of a carboxylic acid and in particular, palladium acetate. The preferred component (b) in the catalyst compositions is an anion of an acid with a pKa of less than 4 (determined in aqueous solution at 18° C.) such as a non-hydrohalogenic acid and in particular an anion of an acid with a pKa of less than 2. More specifically, preference is given to an anion of a sulfonic acid, such as para-toluenesulfonic acid or an anion of a carboxylic acid, such as trifluoroacetic acid. In the catalyst compositions, component (b) is preferably present in a quantity of from 0.5 to 200 and in particular of from 1.0 to 100 equivalents per gram atom of palladium. Component (b) may be taken up in the catalyst compositions in the form of an acid and/or in the form of a salt. Eligible salts include non-noble transition metal salts and in particular, copper salts. If desired, components (a) and (b) may be used as combined in a single compound. An example of such compound is the complex $Pd(CH_3CN)_2(O_3S\text{—}C_6H_4\text{—}CH_3)_2$ which can be prepared by the reaction in acetonitrile of either palladium chloride with silver para-tosylate, or palladium acetate with para-toluenesulfonic acid.

In the compounds used as components (c), $M_1$ and $M_2$ are preferably similar to one another. Particular preference is given to components (c) wherein $M_1$ and $M_2$ both represent phosphorus. In the catalyst compositions, component (c) is preferably present in a quantity of 0.1-2 and in particular, in the amount of 0.75-1.5 mol per mol of palladium compound. The groups $R_1$, $R_2$, $R_3$ and $R_4$ present in the compounds used as components (c) are preferably aryl groups which optionally are substituted with polar groups and in particular phenyl groups which optionally are substituted with polar groups. Preferably, at least one of the groups $R_1$, $R_2$, $R_3$ and $R_4$ contains at least one polar substituent. Eligible polar substituents include dialkyl-amino groups, such as dimethylamino groups and alkoxy groups such as methoxy and tert.butoxy groups. Preference is given to alkoxy groups and in particular to methoxy groups, as polar substituents. Particular preference is given to components (c) in which the groups $R_1$, $R_2$, $R_3$ and $R_4$ are similar to one another. If one or more of the groups $R_1$, $R_2$, $R_3$ and $R_4$ are aryl groups comprising one or more polar substituents, at least one of these polar substituents preferably occupies a position ortho with respect to the phosphorus atom to which the aryl group is attached. Examples of such polar-substituted aryl groups are the 2-methoxy-phenyl group and the 2,4-dimethoxy-phenyl group. Preference is given to components (c) in which the groups $R_1$, $R_2$, $R_3$ and $R_4$ are 2-methoxy-phenyl groups.

In the compounds of the general formula $R_1R_2M_1$—R—$M_2R_3R_4$ which are used as components (c) in the catalyst compositions, R represents a bivalent bridging group which contains at least two carbon atoms in the bridge. Preferably, bridging group R contains 3 atoms in the bridge wherein at least two of which are carbon atoms. Examples of suitable bridging groups, R, are the —$CH_2$—$CH_2$—$CH_2$— group, the —$CH_2$—$C(CH_3)_2$—$CH_2$— group, the —$CH_2$—$Si(CH_3)_2$—$CH_2$— group and the —$CH_2$—$C(R_5)(R_6)$—$CH_2$— group wherein $R_5$ represents a methyl group and $R_6$ a diphenyl-phosphino methyl group.

In order to enhance the activity of the present catalyst compositions, it is preferred to incorporate a 1,4-quinone as a component (d). Optionally alkyl-substituted 1,4-benzoquinones, may be used herein, but other eligible 1,4-quinones, such as alkyl-substituted 1,4-naphthoquinones may also be used herein. It is preferred to use 1,4-benzoquinone and 1,4-naphthoquinone as promoters. The quantity of 1,4-quinone used preferably amounts to 10-1000 mol and in particular 25-250 mol per gram atom of palladium.

The polymerization according to the invention is typically carried out by contacting the monomers with a solution of the palladium-containing catalyst composition in a diluent in which the polymers are not or virtually not soluble. During the polymerization, the polymers are obtained in the form of a suspension in the diluent. After the required degree of polymerization is reached, the polymerization is typically terminated by cooling and releasing the pressure. The polymers may be isolated from the suspension, for instance by filtration or centrifugation. Lower aliphatic alcohols, such as methanol and ethanol, as well as mixtures of lower aliphatic alcohols and lower aliphatic ketones, such as mixtures of methanol with acetone or with methyl ethyl ketone, have proven very suitable diluents.

The lower aliphatic alcohols which are eligible for use as diluents or diluent compositions in the polymerization of the invention may contain such contaminants as halogen compounds and ammonia. These compounds may exert an adverse influence on average reaction rates during polymerization. Therefore, when lower aliphatic alcohols are used as diluents or diluent components, preference is given to alcohols containing less than 1 ppmw halogen and less than 1 ppmw ammonia.

The quantity of catalyst composition used in the preparation of the polymers may vary wide ranges. Per mol of olefinically unsaturated compound to be polymerized, such a quantity of catalyst is preferably used as to contain $10^{-7}-10^{-3}$, and in particular $10^{-6}-10^{-4}$, gram atom of palladium.

The preparation of the polymers is preferably carried out at a temperature of 20°–200° C. and a pressure of 1–200 bar and in particular at a temperature of 30°–150° C. and a pressure of 20–100 bar. In the mixture to be polymerized, the molar ratio of the olefinically unsaturated organic compounds relative to carbon monoxide is preferably 10:1–1:5 and in particular, 5:1–1:2.

The invention is now illustrated with the aid of the following examples.

EXAMPLE 1

A carbon monoxide/ethene/propene terpolymer was prepared as follows. A mechanically stirred autoclave of 300 ml capacity was charged with 180 ml of methanol. Air present in the autoclave was expelled therefrom by pressurizing the autoclave with carbon monoxide until a pressure of 50 bar was reached, whereupon the pressure was released; this procedure was repeated twice over. After the autoclave had been brought to a temperature of 85° C., propene was introduced under pressure until a pressure of 10 bar was reached, followed by ethene until a pressure of 26 bar was reached and finally pure carbon monoxide (with iron and sulfur contents of less than 0.1 ppmw each) until a pressure of 56 bar was reached. Then a catalyst solution was introduced into the autoclave, consisting of:

4.5 ml of methanol,
1.5 ml of toluene,
0.001 mmol of palladium acetate,
0.02 mmol of trifluoroacetic acid, and
0.0012 mmol of 1,3-bis[di(2-methoxy-phenyl)phosphino] propane.

the pressure was maintained at 56 bar by introducing under pressure a 1:1 carbon monoxide/ethene mixture. After 20 hours the polymerization was terminated by cooling the reaction mixture down to room temperature and releasing the pressure. The terpolymer was filtered off, washed with methanol and dried at 70° C.

16 g of terpolymer was obtained. Thus, the average polymerization rate was 7500 g terpolymer/g palladium/hour.

EXAMPLE 2

A carbon monoxide/ethene/propene terpolymer was prepared substantially is the same way as the terpolymer of Example 1, except that after the introduction of carbon monoxide, air was fed into the autoclave until a pressure of 57 bar was reached.

The results with respect to yield and average polymerization rate were the same for Example 1.

EXAMPLE 3

A carbon monoxide/ethene/propene terpolymer was prepared substantially in the same way as the terpolymer of Example 1, except that after the introduction of carbon monoxide, carbon dioxide was fed into the autoclave until a pressure of 71 bar was reached.

The results with respect to yield and average polymerization rate were the same as for Example 1.

EXAMPLE 4

A carbon monoxide/ethene/propene terpolymer was prepared substantially in the same way as the terpolymer of Example 1, except that after the introduction of carbon monoxide, hydrogen was fed into the autoclave until a pressure of 66 bar was reached.

The results with respect to terpolymer yield and average polymerization rate were the same as for Example 1.

EXAMPLE 5

A carbon monoxide/ethene/propene terpolymer was prepared substantially in the same way as the terpolymer of Example 1, except that 3 ml of the methanol present in the autoclave was replaced by 3 ml of water.

The results with respect to terpolymer yield and average polymerization rate were the same as for Example 1.

EXAMPLE 6

A carbon monoxide/ethene/propene terpolymer was prepared substantially in the same way as the terpolymer of Example 1, except for the following differences:

(a) a carbon monoxide was used to which so much COS had been added that the sulfur content was 1.7 ppmw, and (b) the polymerization time was 18.2 hours instead of 20 hours. 11.2 g terpolymer was obtained.

Thus, the average polymerization rate was 5800 g terpolymer/g palladium/hour.

EXAMPLE 7

A carbon monoxide/ethene/propene terpolymer was prepared substantially in the same way as the terpolymer of Example 1, except for the following differences:

(a) a carbon monoxide was used to which so much COS had been added that the sulfur content(s) was 6.9 ppmw, and (b) the polymerization time was 36 hours instead of 20 hours.

5.9 g of terpolymer was obtained. Thus, the average polymerization rate was 1500 g terpolymer/g palladium/hour.

EXAMPLE 8

A carbon monoxide/ethene/propene terpolymer was prepared substantially in the same way as the terpolymer of Example 1, except that to the carbon monoxide used so much $H_2S$ had been added that the sulfur content was 0.7 ppmw.

14.3 g of terpolymer was obtained. Thus, the average polymerization rate was 6750 g terpolymer/g palladium/hour.

EXAMPLE 9

A carbon monoxide/ethene/propene terpolymer was prepared substantially in the same way as the terpolymer of Example 1, except for the following differences:

(a) a carbon monoxide was used to which so much $H_2S$ had been added that the sulfur content was 5 ppmw, and (b) the polymerization time was 36 hours instead of 20 hours.

9.8 g of terpolymer was obtained. Thus, the average polymerization rate was 2580 g terpolymer/g palladium/hour.

EXAMPLE 10

A carbon monoxide/ethene/propene terpolymer was prepared substantially in the same way as the terpolymer of Example 1, except that a carbon monoxide was used to which so much $Fe(CO)_5$ had been added that the iron content was 13.5 ppmw.

12.5 g of terpolymer was obtained. Thus, the average polymerization rate was 5900 g terpolymer/g palladium/hour.

EXAMPLE 11

A carbon monoxide/ethene/propene terpolymer was prepared substantially in the same way as the terpolymer of Example 1, except for the following differences:

(a) a carbon monoxide was used to which so much $Fe(CO)_5$ had been added that the iron content was 40 ppmw, and (b) the polymerization time was 31 hours instead of 20 hours.

10 g of terpolymer was obtained. Thus, the average polymerization rate was 3000 g terpolymer/g palladium/hour.

EXAMPLE 12

A carbon monoxide/ethene/propene terpolymer was prepared substantially in the same way as the terpolymer of Example 1, except for the following differences:

(a) a carbon monoxide was used to which so much $H_2S$ and $Fe(CO)_5$ had been added that the sulphur content was 3.3 ppmw and the iron content 30 ppmw, and (b) the polymerization time was 43 hours instead of 20 hours.

6.9 g of terpolymer was obtained. Thus, the average polymerization rate was 1500 g terpolymer/g palladium/hour.

EXAMPLE 13

A carbon monoxide/ethene/propene terpolymer was prepared substantially in the same way as the terpolymer of Example 1, except for the following difference. The carbon monoxide available for the polymerization contained 3.3 ppmw sulfur as $H_2S$ and 30 ppmw iron as $Fe(CO)_5$. Prior to being fed into the autoclave, this carbon monoxide was passed through a bed consisting of a copper catalyst containing 30% w copper supported on a carrier (BASF-R3-11) in order to remove sulfur and subsequently through a bed consisting of activated carbon (NORIT-RB1) in order to remove iron. The carbon monoxide thus purified and containing less than 0.1 ppmw of sulphur and less than 0.1 ppmw of iron was used to prepare the terpolymer.

The results with respect to yield and average polymerization rate were the same as for Example 1.

Of Examples 1-13, Example 13 is an example according to the invention. In this example, a carbon monoxide which contained sulfur as $H_2S$ and iron as $Fe(CO)_5$ and did not satisfy the relation $X+1/9\,Y<3/10\,Z$ was subjected consecutively to a purifying treatment in order to reduce the sulfur content and to a purifying treatment in order to reduce the iron content, as a result of which the sulfur and iron contents decreased to such an extent that the above relation was met, and the carbon monoxide thus purified was used to prepare a carbon monoxide/ethene/propene terpolymer. Examples 1-12 are outside the scope of the invention. They have been included herein for comparison.

Example 1 relates to a polymerization process in which a carbon monoxide is employed which contains less than 0.1 ppmw sulfur and less than 0.1 ppmw iron and which amply meets the relation $X+1/9\,Y<3/10\,Z$. This Example serves as a reference example for Examples 2-13.

Examples 2-5 demonstrate that oxygen, hydrogen, carbon dioxide and water in the carbon monoxide—even when they are present is very high concentrations—have not the slightest adverse effect on average polymerization reaction rates.

In Examples 6, 8 and 10, in which the carbon monoxides used contained 1.7 ppmw S as COS, 0.7 ppmw S as $H_2S$ and 13.5 ppmw Fe as $Fe(CO)_5$, respectively, and in which the relation $X+1/9\,Y<3/10\,Z$ was satisfied, reductions in average reaction rates were observed which amounted to 23, 10 and 22%, respectively, as seen by reference to Example 1.

In Examples 7, 9, 11 and 12, in which the carbon monoxides used contained 6.9 ppmw S as COS, 5 ppmw S as $H_2S$ and 40 ppmw Fe as $Fe(CO)_5$ and 3.3 ppmw S as $H_2S+30$ ppmw Fe as $Fe(CO)_5$, respectively, and in which the relation $X+1/9\,Y<3/10\,Z$ was not satisfied, reductions in average reaction rates were observed which amounted to 80, 66, 60 and 80%, respectively, as seen by reference to Example 1.

With the aid of $^{13}$C-NMR analysis it was established that the carbon monoxide/ethene/propene terpolymers prepared according to Examples 1-13 had a linear structure and consisted of units of the formula $-(CO)-C_2H_4-$ and units of the formula $-(CO)-C_3H_6-$, which units occurred randomly distributed within the terpolymers.

What is claimed is:

1. A process for preparation of polymers, wherein carbon monoxide containing a second component which is a member of the group consisting of: sulfur and iron, and mixtures thereof, is subjected to one or more purifying treatments wherein the content of the second component is decreased purifying the carbon monoxide, and the carbon thus purified is polymerized together with one or more olefinically unsaturated compounds by contacting with a palladium-containing catalyst composition.

2. The process as claimed in claim 1, wherein the carbon monoxide contains such a quantity of said second component that the second component substantially exceeds the value expressed in the relation $X+1/9\,Y<3/10\,Z$ and that after the application of one or more of the said purifying treatments, this relation is met; in the above relation X represents the quantity of sulfur when sulfur is the second component and Y represents the quantity of iron when iron is the second component, expressed as ppmw, calculated on carbon monoxide and Z represents the quantity of palladium present in the catalyst composition used during polymerization, expressed as ppmw, calculated on the quantity of polymer to be prepared.

3. The process as claimed in claim 1, wherein the carbon monoxide contains such a quantity of said second component such that the second component substantially exceeds the value expressed in the relation $X+1/9\,Y<2/10\,Z$, and that after the application of one or more of the said purifying treatments, this relation is met; in the above relation X represents the quantity of sulfur when sulfur is the second component and Y represents the quantity of iron when iron is the second component, expressed as parts per million by weight, calculated on carbon monoxide and Z represents the quantity of palladium present in the catalyst composition used during polymerization, expressed as parts per million by weight, calculated on the quantity of polymer to be prepared.

4. The process as claimed in claim 1, wherein the carbon monoxide contains such a quantity of said second component such that the second component substantially exceeds the value expressed in the relation $X+1/9\ Y<1/10\ Z$, and that after the application of one or more of the said purifying treatments, this relation is met; in the above relation X represents the quantity of sulfur when sulfur is the second component and Y represents the quantity of iron when iron is the second component, expressed as parts per million by weight, calculated on carbon monoxide and Z represents the quantity of palladium present in the catalyst composition used during polymerization, expressed as parts per million by weight, calculated on the quantity of polymer to be prepared.

5. The process as claimed claim 1, wherein said carbon monoxide is passed through a bed consisting of a copper catalyst supported on a carrier in order to decrease sulfur content.

6. The process as claimed in claims 1, wherein said carbon monoxide is passed through a bed consisting of activated carbon in order to decrease the iron content.

7. The process as claimed in claim 1, wherein said olefinically unsaturated compounds are hydrocarbons.

8. The process as claimed in claim 1, wherein said olefinically unsaturated compound is a member of the group: ethene, a mixture of ethene with another olefinic hydrocarbon, or a mixture of ethene with propene.

9. The process as claimed in claim 7, characterized in that the olefinically unsaturated compounds contain less than 5 parts per million by weight alkynes, less than 5 parts per million by weight conjugated dienes, and less than 5 parts per million by weight allenes.

10. The process as claimed in claim 1, wherein the catalyst composition employed is based upon:
(a) a palladium compound,
(b) an anion of a non-hydrohalogenic acid with a pKa of less than 4, and
(c) a compound of the general formula $R_1R_2M_1-R-M_2R_3R_4$, wherein $M_1$ and $M_2$ represents similar or different elements chosen from the group; arsenic, antimony, phosphorus or nitrogen, wherein $R_1$, $R_2$, $R_3$ and $R_4$ represent similar or different hydrocarbon groups which are unsubstituted or substituted with polar groups and wherein R represents a bivalent bridging group containing at least two carbon atoms in the bridge.

11. The process as claimed in claim 10, wherein the catalyst composition employed is based upon a palladium salt of a carboxylic acid, as component (a) and an anion of an acid with a pKa of less than 2 as component (b).

12. The process as claimed in claim 11, wherein the palladium salt of carboxylic acid is palladium acetate.

13. The process as claimed in claim 9, wherein the catalyst composition is based upon a member of the group consisting of an anion of a sulfonic acid, and an anion of a carboxylic acid, as component (b), and wherein component (b) is present in the catalyst composition in a quantity of from 1.0 to 100 equivalents per gram atom of palladium.

14. The process of claim 13, wherein the sulfonic acid is paratoluene sulfonic acid and the carboxylic acid is trifluoroacetic acid.

15. The process as claimed in claim 10, wherein said catalyst composition component (b) is in the form of an acid.

16. The process as claimed in claim 10, wherein said catalyst composition is in the form of a non-noble transition metal salt.

17. The process as claimed in claim 16, wherein the non-noble transition metal salt is a copper salt.

18. The process as claimed in claim 10, wherein $M_1$ and $M_2$ of component (c) are phosphorus.

19. The process as claimed in claim 10, wherein component (c) is present in a quantity of 0.75-1.5 mol per mol of palladium compound.

20. The process as claimed in claim 10, wherein groups $R_1$, $R_2$, $R_3$ and $R_4$ present in component (c) are aryl groups which are unsubstituted or substituted with polar groups.

21. The process as claimed in claim 20, wherein the groups $R_1$, $R_2$, $R_3$ and $R_4$ present in component (c) are phenyl groups which are unsubstituted or substituted with polar groups.

22. The process as claimed in claim 10, wherein at least one of the groups $R_1$, $R_2$, $R_3$ and $R_4$ present in component (c) contains at least one polar substituent.

23. The process as claimed in claim 22, wherein the polar groups are alkoxy groups.

24. The process as claimed in claim 23, wherein the polar groups are methoxy groups.

25. The process as claimed in claim 10, wherein $R_1$, $R_2$, $R_3$ and $R_4$ present in component (c) are similar to one another.

26. The process of claim 10, wherein one or more of the groups $R_1$, $R_2$, $R_3$ and $R_4$ present in component (c) are polar-substituted aryl groups, in which at least one of the polar substituents occupies an ortho position with respect to the phosphorus atom to which the aryl groups is bound.

27. The process as claimed in claim 26, wherein $R_1$, $R_2$, $R_3$ and $R_4$ present in component (c) are 2-methoxyphenyl groups.

28. The process as claimed in claim 10, wherein component (c) has a bivalent bridging group which contains three atoms in the bridge at least two of which are carbon atoms.

29. The process as claimed in claim 10, wherein said catalyst composition additionally comprises a component (d), a 1,4-quinone.

30. The process as claimed in claim 29, wherein component (d) is 1,4-benzoquinone or 1,4-naphthoquinone in a quantity of 25-250 mol per gram atom of palladium.

31. The process as claimed in claim 1, wherein polymerization is carried out by contacting the monomers with a solution of the catalyst composition in an organic diluent in which the polymers are not or virtually not soluble.

32. The process as claimed in claim 31, wherein the organic diluent is a lower aliphatic alcohol that contains less than 1 parts per million by weight halogen and less than 1 parts per million by weight ammonia.

33. The process as claimed in claim 1, wherein polymerization temperature is 30°-150° C., pressure is 20-100 and, the molar ratio of the olefinically unsaturated organic compounds relative to carbon monoxide, is 5:1-1:2, and the palladium quantity is $10^{-6}-10^{-4}$ gram atom of palladium.

34. The process of claim 31, wherein the organic diluent is a member of the group: a lower aliphatic alcohol, or a mixture of a lower aliphatic alcohol and a lower aliphatic ketone.

* * * * *